United States Patent [19]

Mercier et al.

[11] 4,145,237

[45] Mar. 20, 1979

[54] METHOD AND APPARATUS FOR SIMULTANEOUSLY SEALING TWO EDGES OF A MULTIPLE PANE WINDOW

[75] Inventors: Alain Mercier, Courbevoie; Yves Fournier, Chalon-sur-Saone, both of France

[73] Assignee: Saint-Gobain Industries, Neuilly-sur-Seine, France

[21] Appl. No.: 621,026

[22] Filed: Oct. 9, 1975

[30] Foreign Application Priority Data

Oct. 10, 1974 [FR] France .............................. 74 34156

[51] Int. Cl.² ......................... E06B 3/63; C03C 27/00

[52] U.S. Cl. .................................... 156/107; 156/109; 156/244.22; 156/357; 156/360; 156/500; 156/578; 271/240

[58] Field of Search ............... 156/107, 109, 292, 356, 156/357, 500, 360, 566, 574, 575, 578, 244, 556, 559, 560, 562; 428/34; 118/316, 315, 408, 411, 412; 114/86; 214/1 S; 52/616; 198/345, 416; 271/240; 65/55

[56] References Cited

U.S. PATENT DOCUMENTS

| | | | |
|---|---|---|---|
| 2,294,472 | 9/1942 | MacKenzie | 72/89 |
| 2,951,317 | 9/1960 | Woods | 65/58 |
| 2,999,036 | 9/1961 | Clever et al. | 427/284 |
| 3,205,056 | 9/1965 | Roetter et al. | 156/556 |
| 3,424,836 | 1/1969 | McKelvey et al. | 118/316 |
| 3,473,988 | 10/1969 | Rullier et al. | 156/107 |
| 3,543,385 | 12/1970 | Javaux et al. | 65/58 |
| 3,701,643 | 10/1972 | Frank | 271/240 |
| 3,759,771 | 9/1973 | Battersby | 156/109 |
| 3,876,489 | 4/1975 | Chenel | 156/109 |
| 3,886,013 | 5/1975 | Bowser et al. | 156/109 |
| 3,947,311 | 3/1976 | Jarchow et al. | 156/178 |

FOREIGN PATENT DOCUMENTS

| | | | |
|---|---|---|---|
| 2031588 | 12/1971 | Fed. Rep. of Germany. | |
| 2402642 | 7/1975 | Fed. Rep. of Germany | 65/58 |
| 1102983 | 2/1968 | United Kingdom. | |
| 1380852 | 1/1972 | United Kingdom. | |

*Primary Examiner*—Michael W. Ball

*Attorney, Agent, or Firm*—Pennie & Edmonds

[57] ABSTRACT

A method and apparatus for simultaneously applying sealing material to two opposite parallel edges of a multiple-pane window includes moving the window parallel to the opposite edges thereof between a pair of opposed extrusion nozzles, maintaining a substantially fixed separation of the nozzles during the travel of the window therebetween, and actuating the nozzles simultaneously to deposit sealing material from end to end of the opposite edges. In the apparatus, centering means are provided upstream of the nozzles and carrier means fixedly engages a window between the edges thereof. The centering means includes a pair of frames mounted for movement toward and away from each other in parallel relationship, and advantageously the nozzles are mounted at the downstream ends of the frame. The nozzles include means for resiliently biasing them toward the window edges and means for retracting them. The centering means may include a set of rollers for engaging each of the edges, and the sets of rollers may be mounted on respective rods which are turned to bring the rollers into engagement with the window edges. Switches and window edge detectors are used for controlling the centering means and for actuating the nozzles.

14 Claims, 9 Drawing Figures

METHOD AND APPARATUS FOR SIMULTANEOUSLY SEALING TWO EDGES OF A MULTIPLE PANE WINDOW

The present invention pertains to a method and apparatus for simultaneously applying sealing material to two parallel edges of a multiple-pane window. The sealing material is usually a polymerizable plastic material injected by a nozzle.

Multiple-pane windows are well-known which comprise a plurality of panes spaced from each other by joints which hermetically seal off the trapped air space, preventing migration of water vapor and dust. The seals also serve to hold the panes in suitable fixed spacing from each other. In practice these seals are composed of an inner filament of a first plastic material such as polyisobutylene and of an outer coating of a second plastic material such as an elastomer of silicone or polysulfide.

The inner filament is frequently produced by the simultaneous extrusion of two filaments, one containing dessicant materials and the other without. The outer mastic is injected between this inner filament and the actual edges of the glass sheets. By virtue of its good adhesive properties, it maintains a correct mechanical or geometrical positioning of the assembly, while reinforcing the hermetic seal.

The manufacture of such thermally insulating windows is effected on assembly lines which include transport and handling devices together with an extruding machine for deposition of the inner filament and a machine for application of the outer coating.

Such automatic assembly lines have been previously described in U.S. Pat. No. 4,014,733 and assigned to the assignee hereof, and in U.S. Pat. No. 3,876,489, and various elements of the extruding machines and coating machines and elements are described respectively in U.S. Pat. No. 3,473,988 and in British Pat. Nos. 1,441,798 and 1,418,565.

In most of the arrangements which have been proposed, these operations are carried out successively on the various edges of each window, with consequent slowness in operation which is particularly inconvenient in the case of large multiple-pane windows.

It has also been proposed in corresponding to U.S. Pat. No. 3,947,311 to apply the coatings along the four edges by means of two nozzles operating simultaneously and between which a pane, disposed on the bias, is caused to move. The nozzles then move transversely so as to remain in engagement with the edges. In this fashion, it is possible to apply coatings along two intersecting edges, i.e. from one corner to the diagonally opposite corner. Such a procedure for coupling the motions of the nozzles to the motion of the pane is complicated and is subject to the disadvantage that the edges which have already been coated are likely to come into contact with the various transport mechanisms so that subsequently arriving panes are soiled with fresh material which has not yet solidified.

The present invention is intended to surmount these difficulties and provide a method and apparatus which enables applying coatings along opposite edges of a multiple-pane window at high speed, two edges at a time.

An object of the invention is to provide a method of simultaneously coating two opposite edges of a multiple-pane window by two nozzles applied to those edges, characterized by the fact that these nozzles are stationary whereas the window is caused to move parallel to its edges, the plastic material thus being simultaneously applied from one end to the other of the two opposite edges. It is possible to operate in the opposite manner with the window stationary and the nozzles movable, but this is believed to be less convenient.

It is a further object of the invention to provide apparatus for simultaneously applying the coating material to two opposite parallel edges of a multiple-pane window by injection nozzles which are brought to move toward those parallel edges, by means of mechanism in combination with means to support the window, the resulting mechanism being characterized by the presence of centering means which prevent the window from moving laterally with respect to the edges to be coated, and further including carrier means which can be actuated to fixedly engage the window while leaving its edges free so as to impose on it a motion past the nozzles parallel to the said parallel edges by motion of the window with respect to the nozzles.

In one preferred form of the apparatus of the invention, the centering means comprises two bars which are adapted to be shifted parallel to themselves toward or away from each other, and by symmetrical movement with respect to the general longitudinal axis of apparatus, so as to come in contact with the edges of the window along which the plastic material is to be applied, or alternatively so as to bring into contact with those edges centering devices which are fixed to those bars, the two extruding nozzles being disposed opposite each other at the downstream end of the bars so that the bars carry the nozzles with them.

In one embodiment of the invention, the centering elements carried by these bars include centering rollers which are mounted to turn freely on shafts fixed in respect to the bars and adapted to come into contact with the corresponding edges of the glass.

In another embodiment, the centering devices carried by the bars include two rods mounted to rotate about axes parallel to the length of the bars, each rod fixedly carrying a series of shafts on each of which there is mounted for free rotation a roller intended to come into contact with the corresponding edge of the glass. At least one of these rods is rotatable, as by motion of an hydraulic piston coupled to a shaft thereof, so as to move all of the shafts on a given rod together.

The invention will now be further described in terms of presently preferred embodiments thereof, and by reference to the accompanying drawings, in which.

DESCRIPTION OF PREFERRED EMBODIMENTS

Figure 1:
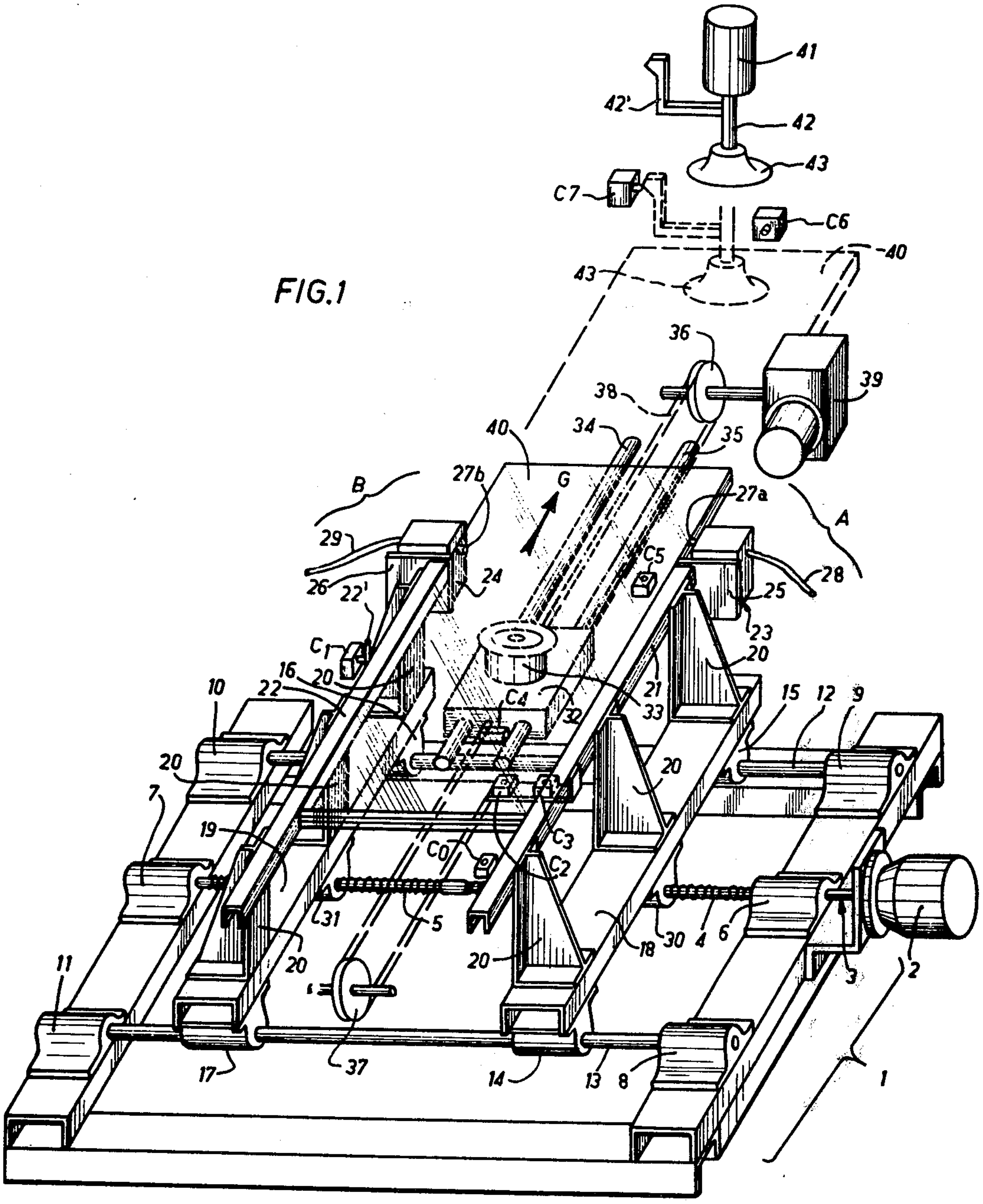
FIG. 1 is a perspective view of an apparatus according to the invention for applying sealing material to the edges of a multiple pane thermally insulated window.

Referring to FIG. 1, the frame 1 is made up of channel or similar members welded together and supports a reversible two-speed motor 2 which drives a lead screw 3 having two halves with oppositely-directed threads identified at 4 and 5. The lead screw is rotatably mounted in bearings 6 and 7 carried by frame 1, and the frame also carries supports 8, 9, 10 and 11 to which are fixed two rails taking the form of cylindrical bars 12 and 13 which are rigid and accurately straight. Supports 14, 15, 16 and 17 are mounted to move freely on these rails with the aid of anti-friction bearings which may be of known form and are not illustrated.

Two parallel beams identified generally by the reference characters A and B rest respectively on the supports 14, 15 and 16, 17. The beams include two channel members 18 and 19 which are welded respectively to the supports 14, 15 and 16, 17. Members 18 and 19 support, by means of angle members 20, respective parallel straight rails 21 and 22 having a U-shaped cross-section.

Injection nozzle heads generally indicated at 23 and 24 are supported on beams A and B by adjusting mechanisms to be described with reference to FIG. 2. These adjusting mechanisms are mounted on plate-shaped supports 25 and 26 fixed with respect to beams A and B. The nozzle heads 23 and 24 each include a nozzle proper identified at 27*a* and 27*b* which are fed with plastic material such as a resin through flexible conduits 28, 29. The mixers and pumps for supplying the plastic material and its catalysts may be of known type and will not be described.

Channel members 18 and 19 of the beams A and B include bearings 30 and 31, respectively, having oppositely-threaded female threads. These cooperate with the two oppositely-threaded portions of the lead screw 3.

Between the beams A and B there is disposed a carriage 32 having a suction cup 33 movable between upper (active) and lower (inactive) positions. The carriage 32 moves along fixed rails 34 and 35 on bearings (not shown), the rails being cylindrical bars which are rigid and straight and which are fixed to frame 1. The carriage 32 is driven by means of sprocket wheels 36, 37 which engage a chain 38 fixed to the carriage. The sprocket wheel 36 is driven by reversible electric motor 39. The wheel 37 turns freely in its bearings, which are not shown.

The portion of the frame which carries the rails 34, 35 and the motor 39 have been omitted from the drawing for clarity.

The pane assembly 40 may be brought into horizontal position on the suction cup 33 of carriage 32 by suitable transport and manipulator mechanism such as that described in our copending application Ser. No. 622,539, filed Oct. 15, 1975 and entitled "APPARATUS FOR SEALING THE FOUR EDGES OF A MULTIPLE-PANE WINDOW."

On opposite sides of the carriage 32 there may also be provided a support mechanism of a type known in the glass industry and omitted from the drawing, which has the function of supporting the pane assembly before the suction cup 33 takes hold of it. This support mechanism may comprise a plurality of spherical or cylindrical rollers.

A manipulator schematically indicated as an hydraulic cylinder 41, whose actuating rod 42 has at its lower end a suction cup 43 and which carries a lateral arm terminating in a stop 42', makes it possible to raise the window pane from the carriage 32 when the operation of applying the sealing material (on two edges) has been carried out.

The apparatus includes a number of photoelectric or microswitch position detectors, of which the most important are those identified at $C_0$ through $C_7$.

To summarize the operation so far, the centering apparatus includes the beams A and B which, under control of reversible motor 2 and lead screw 3, move in parallel relationship toward or away from each other symmetrically with respect to the longitudinal axis of the apparatus. Beams A and B can be brought to bear against opposite edges of the pane assembly 40 along which the sealing material is to be simultaneously applied upon movement of the glass in the direction of arrow G. The extrusion nozzles 27*a* and 27*b* of the heads 23 and 24 are disposed at the ends of the beams A and B, and move with them.

Figure 2:
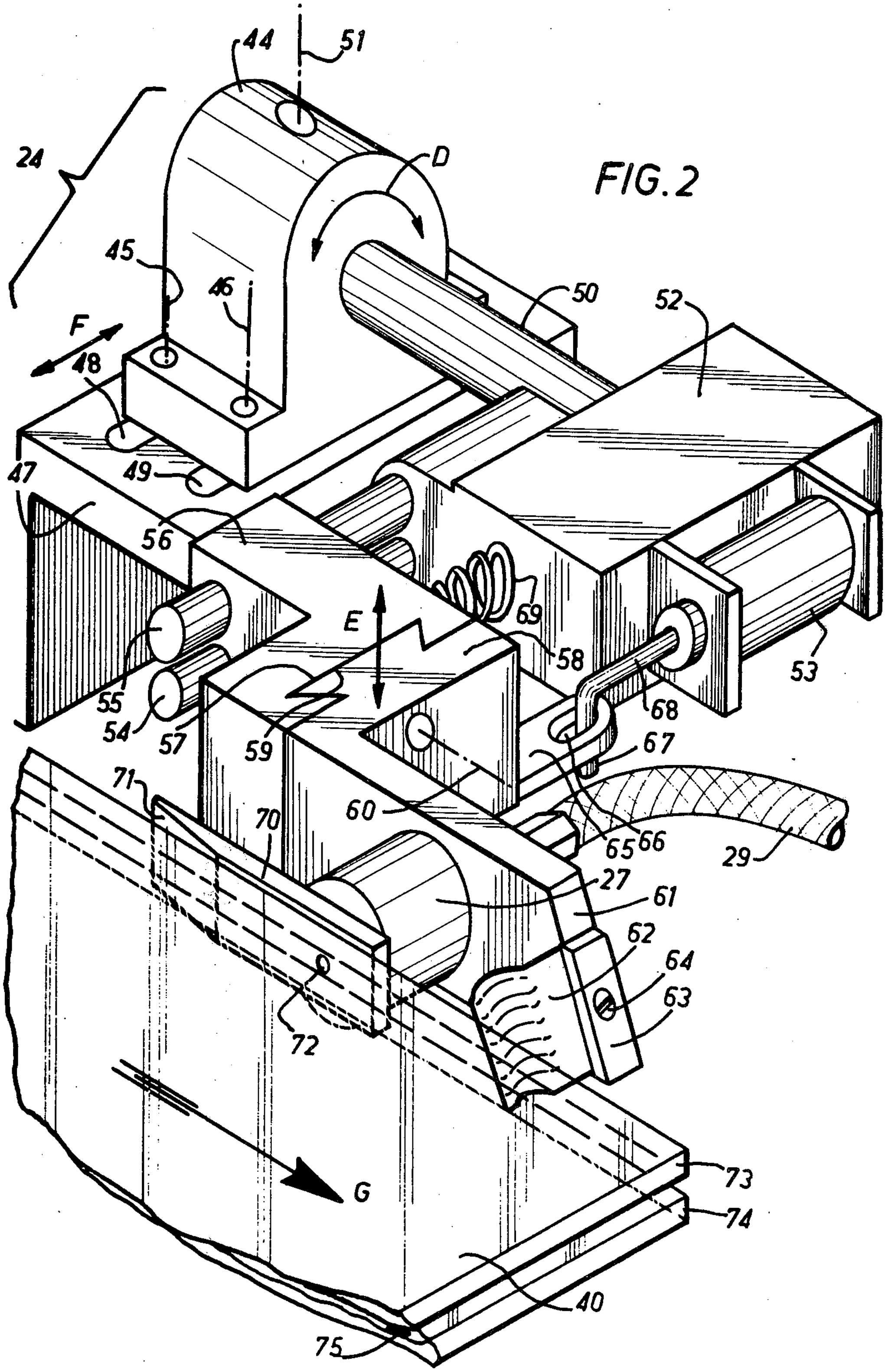
FIG. 2 is a detail view in perspective of an extrusion nozzle arrangement.

FIG. 2 shows in perspective a detail of the support for the head 24, with its flexible supply tube 29 and its nozzle 27, in working relationship with one edge of a multiple pane 40 as it passes thereby.

Holder 44 is mounted by means of bolts identified by their axes 45 and 46 on the horizontal portion of a right angle member 47. The vertical portion of this member is suitably fixed to the support plate 26 of FIG. 1. The horizontal portion includes slots 48 and 49 which permit adjustment of the position of the head as indicated by the arrow F. A shaft 50 mounted in holder 44 is capable of rotation as indicated by the arrow D, and also longitudinal movement, for adjustment. It can be fixed by means of a set screw whose axis is indicated at 51. Member 52 is fastened to the end of shaft 50 and carries an hydraulic actuating cylinder 53 and a pair of cylindrical rails 54, 55 perpendicular to the shaft 50.

A support 56 is mounted by antifriction bearings for translational movement along rails 54, 55. It is provided with a keystone or mortise-shaped slot 57 in which is mounted a right angle member 58 having a matching tongue 59. Member 58 can be fixed to the support 56, after adjustment, by means of a set screw whose axis is indicated at 60. The other limb of member 58 carries the extrusion nozzle 27 and also a scraper 62 which is adjustably fixable in position by screw 64. Member 58 also carries on the side away from the nozzle a member 65 apertured at 66 which receives the hooked portion 67 of the actuating piston rod 68 of cylinder 53. Between the assembly 56, 58 and the member 52 there is provided a compression spring 69 which tends to separate the two.

The nozzle 27 has associated with it a shoe 70 having an inclined surface or ramp 71 and an opening 72 through which the extruded sealing material (for example of polysulfide) passes in order to fill the space between the panes 73 and 74 outside the filament 75 (for example of polyisobutylene) and thereby form a seal.

The operation of the extrusion apparatus will now be described, referring to FIGS. 3 to 7, in each of which there is shown a double pane window as in FIG. 1. As will be understood, the various elements of FIGS. 1 and 2 will need to be adjusted in level with respect to the extruders when it is desired to operate on triple pane windows. FIGS. 3 to 6 show schematically the beams A and B together with the assembly of panes to which the sealing material is to be applied.

Figure 3:
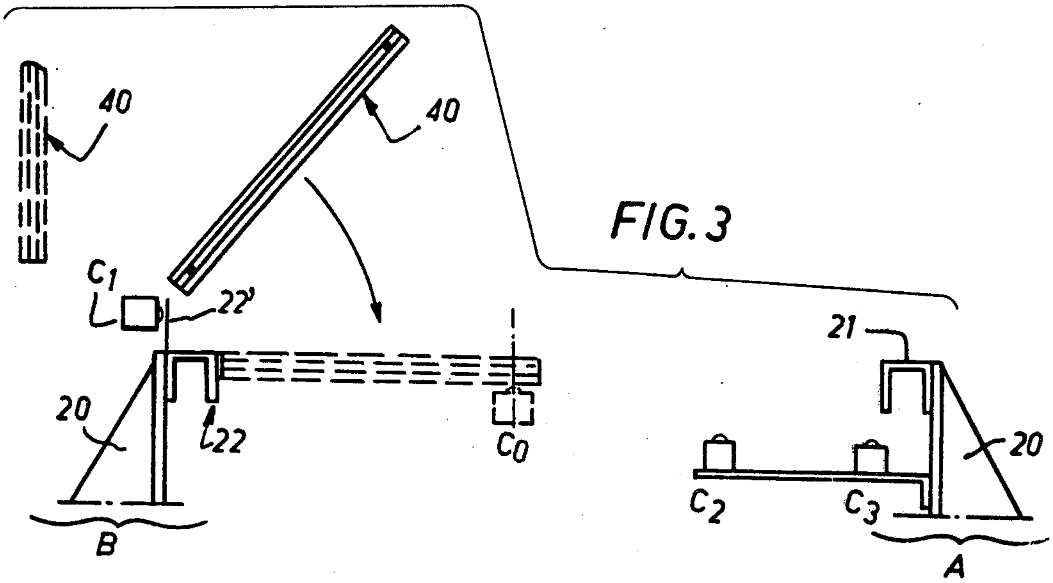
FIGS. 3-6 are diagrammatic views illustrating various phases of the operation of centering the pane assembly.

Initially the beams are at their maximum separation, in which position the beam B holds a microswitch C1 closed, the switch being actuated by a leaf 22' fixed to the rail 22 of the beam. In FIG. 3 the window assembly 40 is shown in dashed lines as it arrives oriented vertically. In this position the pane assembly actuates a microswitch (not shown) which causes it to be grasped by a suction cup manipulator which may be of known type and which shifts the panes into horizontal position onto support means (not shown) located on opposite sides of the carriage 32. When the assembly reaches a horizontal orientation with one of its edges close to the rail 22, the manipulator actuates an end of travel switch $C_0$ which cuts off the vacuum to the suction cups of the manipulator and starts the motor 2 at its high speed to cause the beams A and B to approach each other by operation of the lead screw 3 and the nuts 30 and 31. The end of travel switch $C_1$ is opened as soon as beam B moves away from contact therewith.

Figure 4:
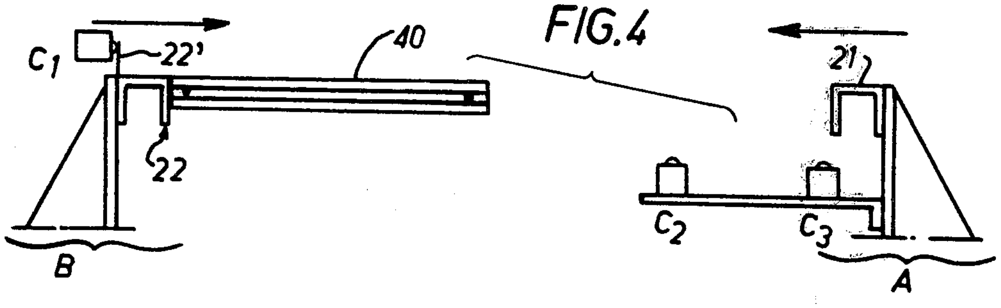
Figure 7:
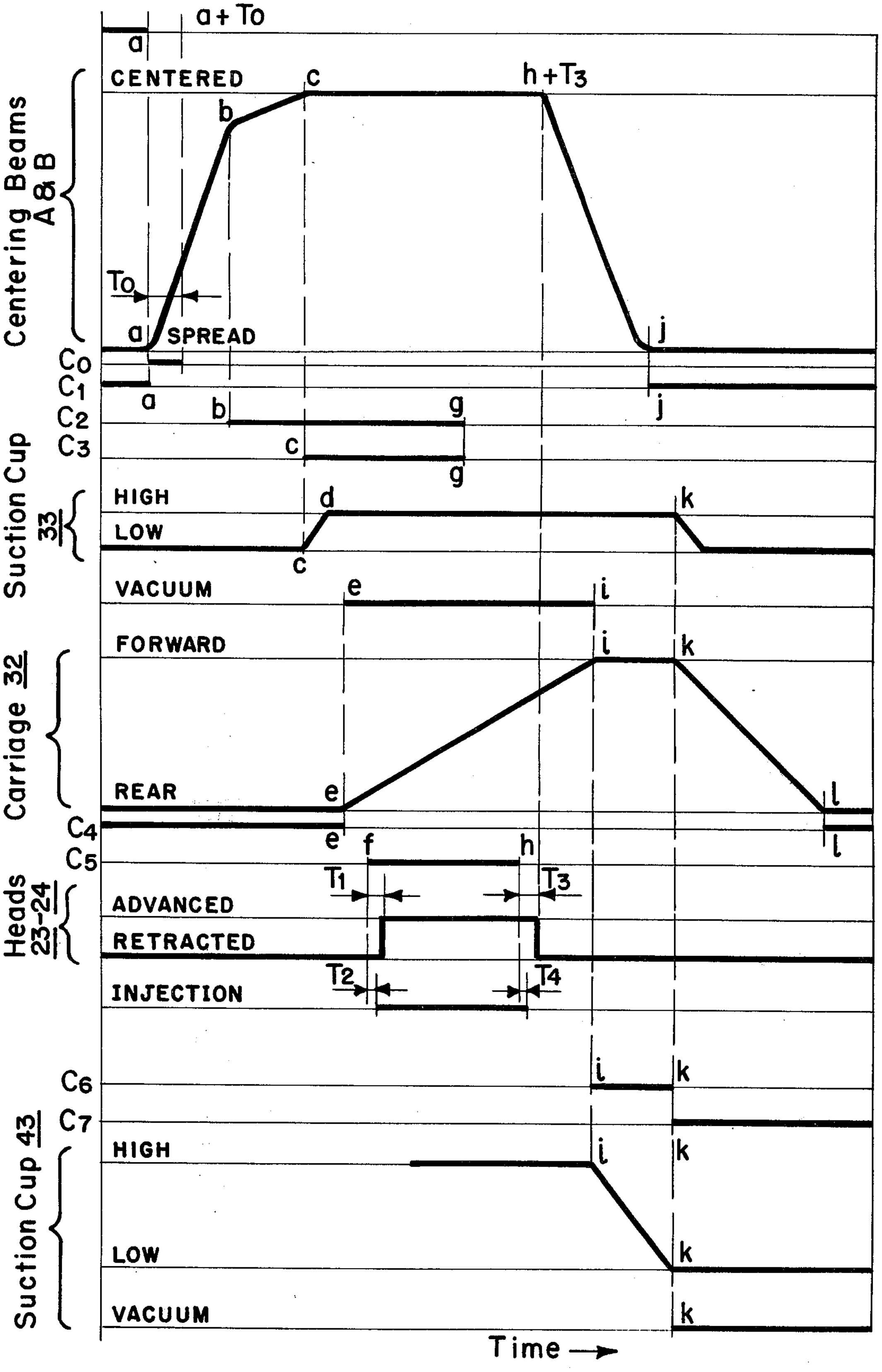
FIG. 7 illustrates successive sequences in the operation of the principal elements of the apparatus of FIGS. 1 and 2.

FIG. 4 illustrates the initiation of this phase, this being also the time indicated at a in FIG. 7.

At a time $a + T_0$, the manipulator (not shown) returns to its original vertical position, opening $C_0$ and leaving the pane assembly in place. Initially the motor 2 turns at high speed with the beam B pushing the pane assembly 40 toward the rail A until the right-hand edge of the assembly as seen in FIG. 4 intersects the optical axis of the photocell detector $C_2$. This shifts the motor 2 to low speed so as to bring the pane assembly gently into center position between and in contact with the beams A and B.

Figure 5:
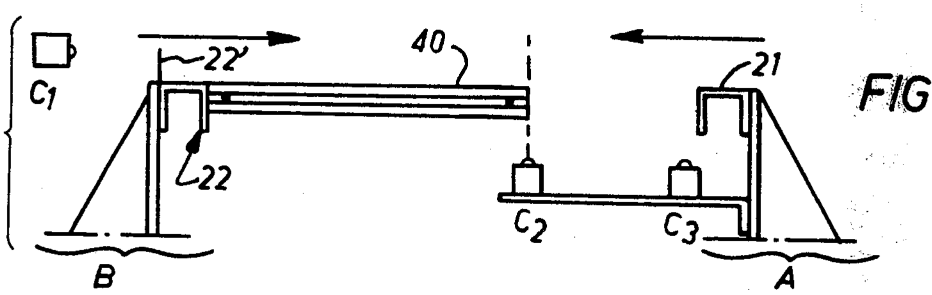

This state of affairs is illustrated in FIG. 5 and represents the time instant b in FIG. 7.

Figure 6:
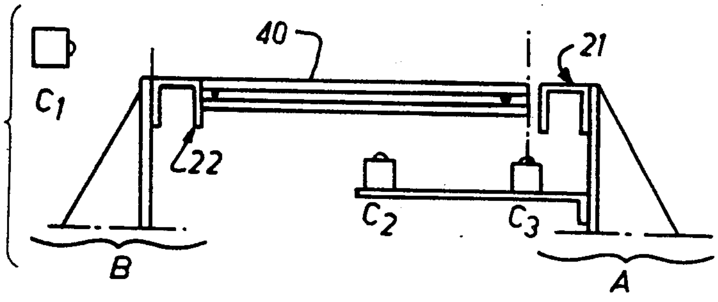

At the slow speed now in effect, the beams A and B approach each other until the detector $C_3$ detects passage of the right-hand edge of the assembly 40, as illustrated in FIG. 6. The detector $C_3$ is disposed only a small distance out of the vertical plane passing through the inner face of the rail 21 of beam A, i.e. at the left-hand limit of its movement. The position in FIG. 6 corresponds to the time instant c of FIG. 7.

It may be noted, and as seen in FIG. 7, that during the shift of the window assembly 40 to the horizontal position and the succeeding centering operation of the beams A and B, the carriage 32 is stationary in its upstream departure position, the suction cup 33 being lowered and without vacuum and the extruder heads 23 and 24 being at rest and retracted. At the time c when the detector $C_3$ is actuated and the motor 2 is deenergized, the rails 21 and 22 of beams A and B will have engaged the opposite edges of the pane assembly which will accordingly be centered with respect to the longitudinal axis of the machine. Simultaneously, the actuating cylinder (not shown) for control of the suction cup 33 is operated to lift that suction cup from its lower to its upper position, which it achieves at the time d in FIG. 7.

After a slight time delay, vacuum is applied to the cup 33 which thereby grasps the pane 40. Simultaneously the motor 39 of carriage 32 is energized and drives the carriage 32 in the direction indicated by the arrow G in FIGS. 1 and 2, thereby carrying the pane 40 toward the injection nozzles 23, 24. This corresponds to the time e of FIG. 7. At this time the upstream end of travel microswitch $C_4$, previously actuated by the carriage 32, is opened.

After a time elapse determined by the dimensions of the pane, the leading edge (i.e. the downstream edge in the direction of motion according to arrow G) intersects the optical axis of the photocell detector $C_5$ disposed a little before (i.e. upstream of) the injection nozzles 27. This occurs at time f of FIG. 7.

The actuation of the detector $C_5$ starts extrusion at the time $f + T_2$. Until the time $f + T_1$ the two extrusion nozzles were in retracted position by action of the cylinder 53, the spring 69 being compressed. At the time $f + T_1$ the nozzles are freed by deenergization of an electrically-operated valve which controls supply of pressure through it to the cylinder 53, this valve not being shown in the drawing. Hence the nozzles pass to their forward or operative position by action of the respective springs 69. The time $T_1$ is designedly made longer than the time $T_2$ in order to compensate for the delay in arrival of the plastic material at the exit of the nozzle.

The leading or downstream edge of the pane assembly 40, now in the vicinity of the injection nozzles 27, comes in due course to bear at its corners against the inclined ramps 71 of the shoes 70. This forces the nozzles 27 and their supporting assemblies 56 and 58 slightly outward, these assemblies being slidably movable on the rails 54 and 55. This outward motion continues until the corners of the leading edge reach the end of ramps 71. Then the opposite side edges of the window assembly move along the shoes 70 and injection or extrusion of the sealing material takes place.

The positions of orifices 72 with respect to the window assembly 40 having been suitably adjusted by the means described in connection with FIG. 2, the injections will occur exactly between the two sheets of glass 73 and 74, any excess material being removed by the flexible scraper 62.

At the time instant g the detectors $C_2$ and $C_3$ are deenergized by the passing of the rear or trailing edge of the assembly 40 through their optical axes.

At the time instant h, the trailing edge of the assembly passes by the optical axis of detector $C_5$. At time $h + T_4$ the extrusion stops and at time $h + T_3$ the injection nozzles are restored to their retracted position, the spring 69 being again placed in compression by action of the cylinder 53 whose supply valve is again energized.

The delays $T_1$, $T_2$, $T_3$ and $T_4$ are adjustable so as to bring the different phases and sequences of the injection into proper relationship, taking into account various delays and events. For example, as already indicated, the injection does not start and does not stop at the exact instant of operation of the valves in view of the inertia along the flow conduits of the polysulfide between the mixing pumps and the orifices 72. The devices for adjustment of the delays may be of known electronic or pneumatic type and need not be described.

At the time $h + T_3$ when the injection has terminated, the motor 2 is again energized by action of detector $C_5$ to restore the beams A and B to their initial spread-apart positions. The carriage 32 continues its downstream motion until the time instant i when its leading edge operates the microswitch $C_6$ in FIG. 1. This shuts off motor 39 and simultaneously cuts off vacuum to the cup 33. It also causes the cup 43 to start downward.

At the time j the beams A and B arrive at their positions of maximum opening and beam B operates the microswitch $C_1$ to deenergize the motor 2.

At the time k the cup 43 arrives at the level of the pane assembly and the catch or stop 42′, carried on the rod 42 of the cylinder 41, operates the microswitch $C_7$. This applies vacuum to the cup 43 to grasp the assembly 40, re-energizes motor 39 to drive the carriage 32 in the return direction, and also moves the cup 33 to its lowered position. The carriage 32 moves rearwardly until the time instant l, at which time it operates the microswitch $C_4$ to deenergize the motor 39.

At this time all elements of the machine have been restored to their original positions, ready for a new glass assembly.

Figure 8:
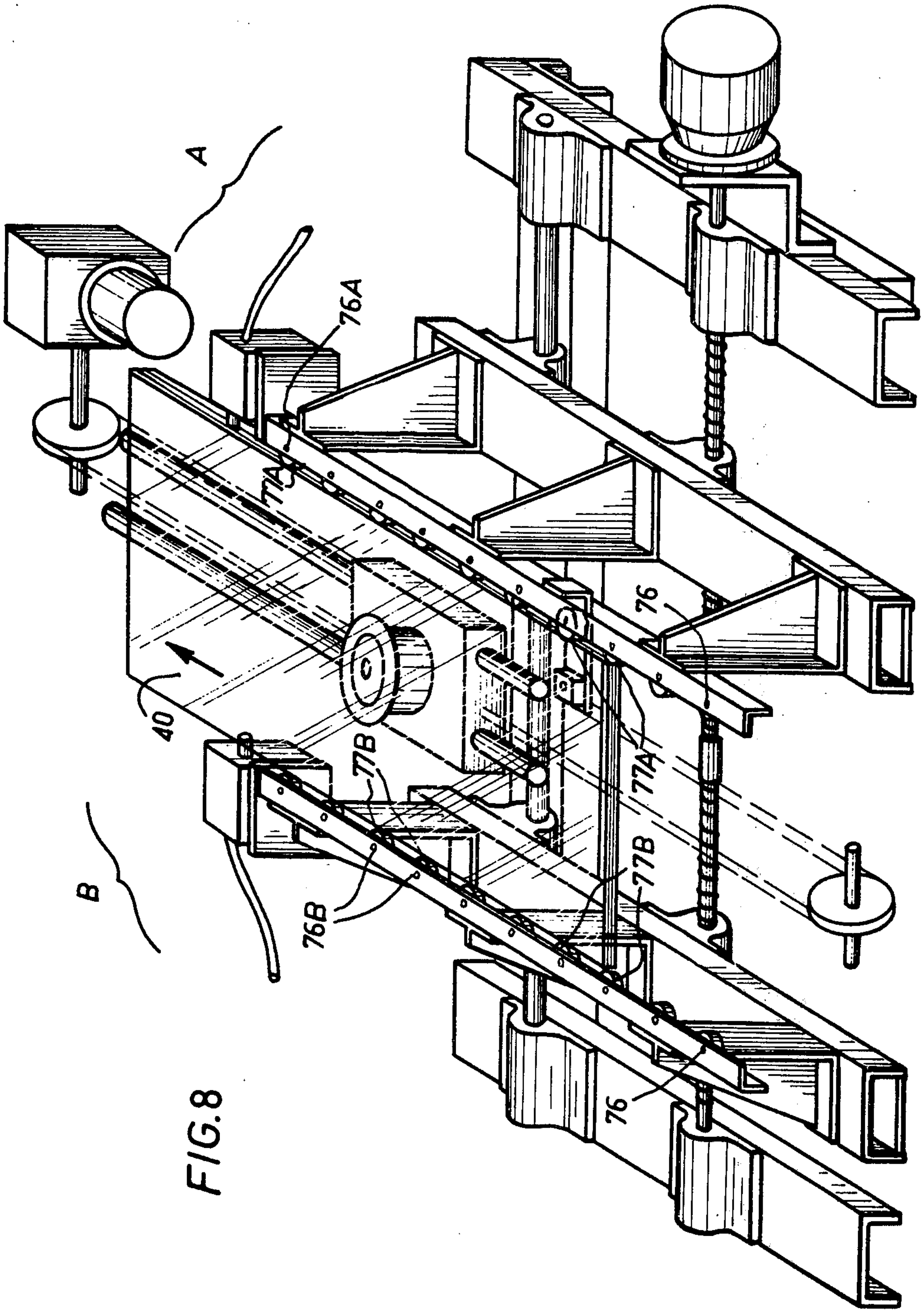
FIG. 8 is a perspective view of modified apparatus for applying sealing material whose rails for centering the pane assembly are provided with rollers on fixed axes.

FIG. 8 shows a modification which is the same as that which has already been described, except as to the beams A and B which are respectively supplied with a series of fixed axles or shafts 76A and 76B. On these are centered rollers 77A, 77B which rotate freely and are intended to come into contact with the opposite edges of the assembly 40 so as to facilitate movement thereof.

Figure 9:
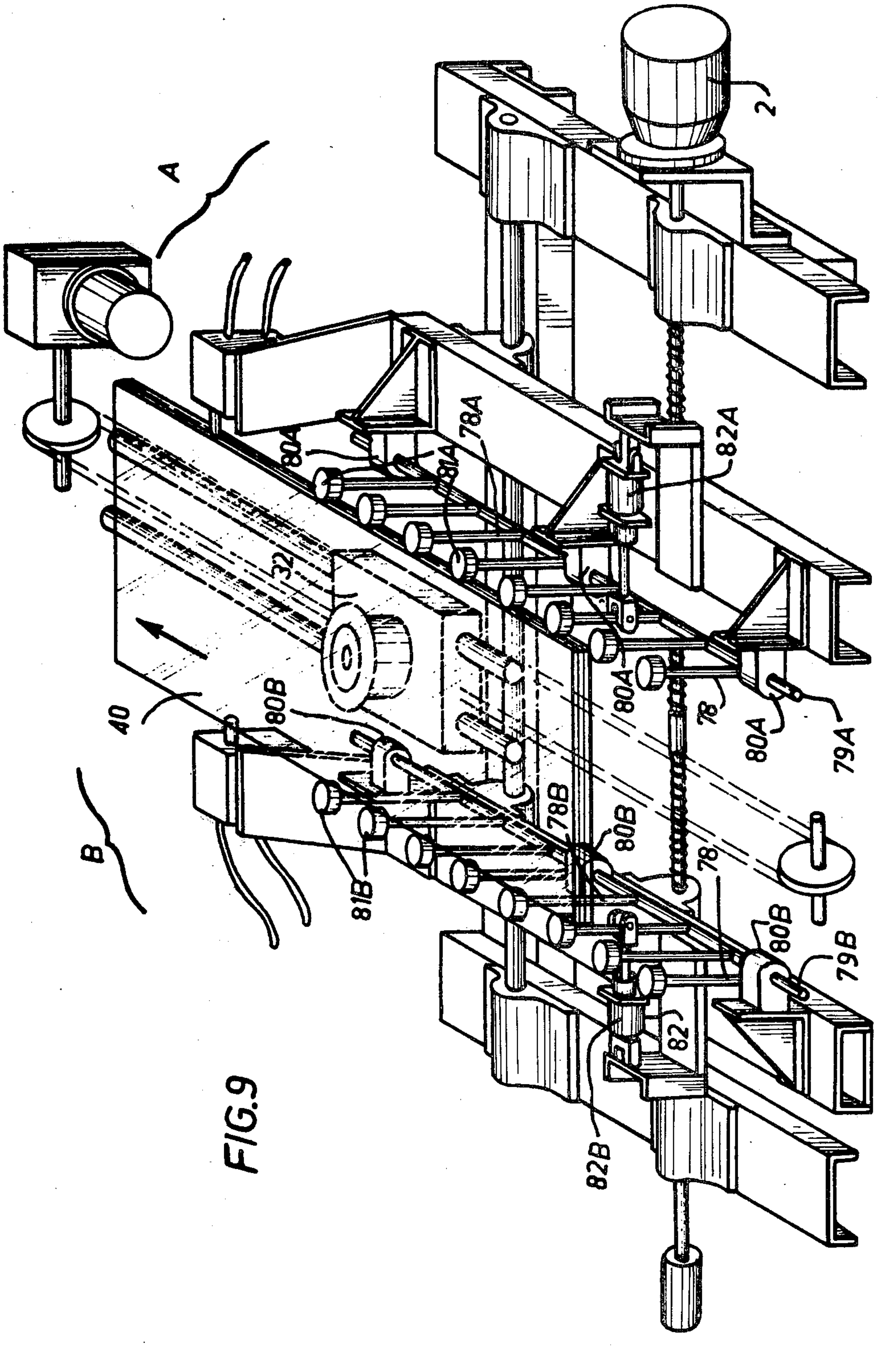
FIG. 9 is a perspective view of further modified apparatus for applying sealing material whose beams are provided with centering rollers on movable axes.

FIG. 9 shows apparatus which is likewise the same as that hereinabove described with reference to FIGS. 1 and 2, except as to the beams A and B. In this embodiment each beam includes a plurality of shafts 78A and 78B fixed respectively to rods 79A and 79B. These rods are parallel to the general longitudinal axis of the machine and are mounted to turn in bearings 80A and 80B which are carried by the beams A and B, respectively. On each of shafts 78A and 78B there is mounted for free rotation a centering roller 81A or 81B. One shaft of each of these assemblies is coupled to a control cylinder 82A or 82B carried by beams A and B, respectively, so as to bring the two assemblies of centering rollers into contact with the opposite edges of the assembly 40 symmetrically with respect to the longitudinal axis of the machine.

This embodiment permits more rapid operation in the centering of the pane assembly. In order to reduce the time required for the motor 2 to shift the beams A and B parallel to each other and symmetrically with respect to the axis of the machine, during which time the window assembly is normally waiting on the carriage 32, it may be desirable to operate this motor in response to a device for measuring the width of the window assembly.

This embodiment makes it possible, even before the assembly has been placed on the carriage 32, to bring the beams close to their centering positions. At this instant the rollers 81A and 81B are in open or spread position by action of the cylinders 82A and 82B so that the assembly may be inserted between the beams. As soon as the window has been placed between the beams, the cylinders 82A and 82B operate on the stem rods 78A and 78B to move the rollers 81A and 81B inward, thereby centering the window assembly.

It will be seen that this system effects an overall saving in time since the movement required to bring the beams A and B together can take place before the window assembly reaches the carriage 32. Accordingly, the time c of FIG. 7 is brought substantially into coincidence with the time a.

As will be understood from the foregoing, the present invention provides a method for simultaneously applying sealing material to two opposite parallel edges of a multiple-pane window which comprises moving a multiple-pane window in a path of travel parallel to said two opposite edges between a pair of opposed extrusion nozzles adjacent the opposite edges, maintaining a substantially fixed separation of the nozzles during the travel of the window therebetween, and actuating the nozzles simultaneously to deposit sealing material from end to end of the opposite edges. The window is restrained from movement laterally of the two edges thereof during the travel between the nozzles.

The invention also provides apparatus comprising a pair of opposed extrusion nozzles spaced apart laterally of the direction of travel of a multiple-pane window therebetween, centering means upstream of the nozzles for engaging the opposite edges of a window and centering it for passage between the nozzles, and carrier means for fixedly engaging a window between the edges thereof and moving the window parallel to the edges past and between the nozzles.

Advantageously the centering means includes a pair of frames such as beams A and B, mounted for movement toward and away from each other in parallel relationship, the frames carrying engaging means for engaging the opposite edges of a window, and the nozzles being mounted at the downstream ends of the frames respectively. The frames may be coupled for simultaneous movement toward and away from a center line therebetween and advantageously the carrier means is positioned to engage the window midway between the frames. The nozzles advantageously have means for resiliently biasing them toward the path of travel of the window, and means for retracting the nozzles.

The engaging means of the frames may include a set of rollers for engaging each of the window edges. The axes of the rollers may be fixed with respect to the frames. Or, the rollers of at least one set may be mounted on shafts attached to a rod which is mounted for rotation about an axis parallel to the respective edge of the window, with means for turning the rod to bring the rollers into engagement with the window edge. Advantageously a pair a rods are provided, on which the rollers are mounted in this manner, with means for turning the rods simultaneously to move the respective sets of rollers into engagement with respective edges of the window to center the window therebetween.

The frames may be coupled by a lead screw lying threads of opposite hand cooperating with threads of opposite hand in respective frames, with driving means for driving the lead screw in either direction.

Means may be provided for positioning a window between the frames with one edge thereof adjacent the engaging means of one frame, with switch means actuated by the positioning for actuating the driving means to bring the engaging means together, and with detector means adjacent the engaging means on the other frame for detecting the passage of the leading edge of the window thereby and stopping the driving means. Detector means may be provided adjacent a line between the nozzles for detecting the passage of the trailing edge of a window traveling thereby, and means responsive to the detector means for actuating the driving means to separate the frames. Switch means may be provided responsive to the arrival of one of the frames to a predetermined outer position for stopping the driving means.

Detector means may be provided adjacent and upstream of a line between the nozzles for detecting the passage of the leading edge of a window traveling thereby, and means responsive to said detector means for actuating the nozzles to their forward positions for applying sealing material to the window edges. Means responsive to the detector means may be provided for initiating extrusion of the sealing material by the nozzles.

We claim:

1. A method for applying sealing material between the panes of a multiple-pane window simultaneously at two opposing parallel edges thereof which comprises:

(a) moving a multiple-pane window in a path of travel parallel to said two opposite edges thereof and between a pair of opposed extrusion nozzles adjacent said opposite edges, (b) centering said window using centering means having a pair of frames upstream of and attached to said nozzles and include engaging means mounted for pivotal movement for engaging said opposite parallel edges of said window, said frames mounted for movement toward and away from each other in parallel relationship by a lead screw having threads of opposite hand, (c) maintaining a substantially fixed lateral separation of said nozzles during the travel of said window therebetween, and (d) actuating said extrusion nozzles simultaneously to deposit sealing material from end to end of said opposite edges.

2. A method according to claim 1 including restraining said window from movement lateral of said two edges thereof during the travel between said nozzles.

3. Apparatus for applying material between the panes of a multiple-pane window simultaneously at two opposite parallel edges thereof which comprises:

(a) a pair of opposed extrusion nozzles spaced apart laterally of the direction of travel of a multiple-pane window and maintained with a substantially fixed lateral separation during the travel of the window therebetween (b) centering means upstream of and attached to said nozzle for engaging opposite edges of said window and centering the window for passage between said nozzles said centering means includes: a pair of frames mounted for movement toward and away from each other in parallel relationship and include engaging means mounted for pivotal movement for engaging said opposite parallel edges of said window, said frames are coupled by a lead screw having threads of opposite hand longitudinally spaced thereon, said frames carrying cooperating threads of opposite hand respectively, and driving means for driving said lead screw in either direction, and (c) carrier means for fixedly engaging said window between said edges thereof and moving the window parallel to said edges past and between said centering means and said nozzles.

4. Apparatus according to claim 3 in which said frames are coupled for simultaneous movement toward and away from a center line therebetween.

5. Apparatus according to claim 3 in which said carrier means is positioned to engage said window midway between said frames.

6. Apparatus according to claim 4 including means for positioning a said window between said frames with one edge thereof adjacent the engaging means of one frame, switch means actuated by the positioning of a said window between said engaging means for actuating said driving means to bring the engaging means together, and detector means adjacent the engaging means on the other frame for detecting the passage of the leading edge of the window thereby and stopping said driving means.

7. Apparatus according to claim 4 including detector means adjacent a line between said nozzles for detecting the passage of the trailing edge of a window traveling thereby, and means responsive to said detector means for actuating said driving means to separate said frames.

8. Apparatus according to claim 7 including switch means responsive to the arrival of one of said frames to a predetermined outer position for stopping said driving means.

9. Apparatus according to claim 3 in which said nozzles are mounted on said frames for movement toward and away from the path of travel of a said window, and including means for resiliently biasing said nozzles toward said path of travel, and means for retracting said nozzles away from said path of travel.

10. Apparatus according to claim 9 including detector means adjacent and upstream of a line between said nozzles for detecting the passage of the leading edge of a window traveling thereby, and means responsive to said detector means for actuating said nozzles to their forward positions for applying sealing material to respective edges of the window.

11. Apparatus according to claim 10 including means responsive to said detector means for initiating extrusion of sealing material by said nozzles.

12. Apparatus according to claim 3 in which said engaging means includes a set of rollers for engaging each of said edges.

13. Apparatus according to claim 12 in which the rollers of at least one of said sets are mounted on axles attached to a rod mounted for rotation about an axis parallel to the respective edge of a said window, and means for turning said rod to bring said rollers into engagement with said edge of a window.

14. Apparatus according to claim 12 in which the rollers of each of said sets are mounted on axles attached to respective rods mounted for rotation about respective axes parallel to the respective opposite edges of a said window, and means for turning said rods simultaneously to move the respective sets of rollers into engagement with respective edges of a window to center the window therebetween.

* * * * *

UNITED STATES PATENT AND TRADEMARK OFFICE
CERTIFICATE OF CORRECTION

PATENT NO. : 4,145,237

DATED : March 20, 1979

INVENTOR(S) : Alain Mercier and Yves Fournier

It is certified that error appears in the above-identified patent and that said Letters Patent are hereby corrected as shown below:

Column 1, line 45, "in corresponding to" should be -- in French No. 2,208,040 corresponding to --;

Column 8, line 37, "screw lying" should be -- screw having --.

Signed and Sealed this

*Twenty-sixth* Day of *June 1979*

[SEAL]

*Attest:*

RUTH C. MASON
*Attesting Officer*

DONALD W. BANNER
*Commissioner of Patents and Trademarks*